A. F. POOLE.
TOGGLE BOLT.
APPLICATION FILED OCT. 27, 1915.
1,271,763.
Patented July 9, 1918.
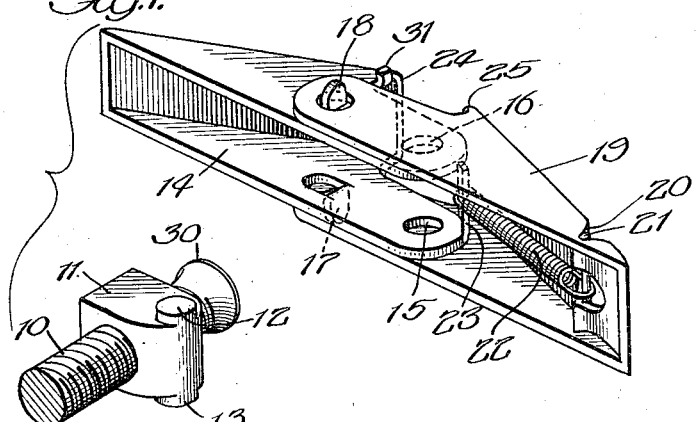
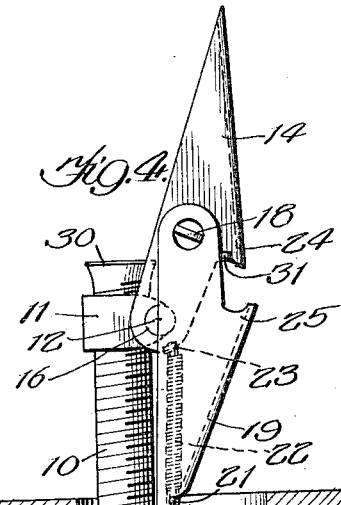
Inventor:
Arthur F. Poole

UNITED STATES PATENT OFFICE.

ARTHUR F. POOLE, OF CHICAGO, ILLINOIS.

TOGGLE-BOLT.

1,271,763.　　　　　Specification of Letters Patent.　　Patented July 9, 1918.

Application filed October 27, 1915. Serial No. 58,251.

*To all whom it may concern:*

Be it known that I, ARTHUR F. POOLE, a citizen of the United States, residing at Chicago, in the county of Cook and State of Illinois, have invented certain new and useful Improvements in Toggle-Bolts, of which the following is a specification.

My invention is an improvement in toggle bolts, used for the purpose of attaching members to a solid wall which does not admit of the possibility of nails or screws.

The object of my invention is the provision of a bolt which is capable of cheap manufacture and which will be easily attached to the place in which it is intended to be used.

This and other objects of my invention will be more fully hereinafter described and claimed.

My invention will be best understood by reference to the accompanying drawings, in which—

Figure 1 is a perspective view of parts of my improved bolt structure.

Fig. 2 is a view showing the bolt in position on a wall.

Fig. 3 is a view showing the bolt in its folded position before insertion into a wall; and Fig. 4 is a view showing the bolt in a position permitting its withdrawal from the wall.

Reference to Fig. 1 will show that the bolt 10 is provided with a threaded nut 11 and this nut is provided with trunnions 12 and 13 which are swedged on the nut. The trunnions 12 and 13 form the pivots for the wing 14, preferably folded from flat stock. This wing is provided with holes 15 and 16 which are adapted to be mounted on the trunnions 12 and 13. From the sides of the wing 14 ears 17 and 18 are thrown out, these ears being adapted to form the pivot of the wing 19, which is also preferably made from folded flat stock. In said wing 19 are two holes which are placed over the ears 17 and 18, the latter thus forming a pivotal support for the wing 19. Said wing has also formed in it a channel 20 which serves to hold in place a rod 21 which serves to attach a coiled spring 22 to the wing 19. The other end of the spring 22 is attached to an ear 23 which is formed on the wing 14. The wing 14 is also furnished with an abutting portion 24 adapted to contact with the bolt 10. Similarly the wing 19 is furnished with an abutting portion 25.

The bolt is shown disassembled in Fig. 1, the bolt and nut being shown in one part and the assembly of the wings in a second part of said figure.

Fig. 2 shows the bolt in its operative position, being inserted through a hole 26 in a wall 27, a washer 28 and nut 29 serving to hold the structure in its attached position.

In Fig. 3 is shown the bolt with the wings folded against the sides of said bolt, preparatory to insertion of the same through the hole in the wall.

After the bolt is inserted, the spring 22 will bolt the wings into an extended position. The bolt is then bolted up against the wall, the two wings forming a truss which is prevented from collapsing by contact of the abutting portions 24 and 25 against the body of the bolt 10.

In case it is desired to remove the bolt from the hole, the nut 29 is removed, the bolt is screwed down into the nut 11 until the expanded head 30 is brought into contact with the nut 11. This removes said head from contact with the abutting portions 24 and 25. A piece of wire is pushed into the hole beside of the bolt and the wing 14 is pushed into position, as shown in Fig. 4, it being obvious that the structure of the two wings as a whole will pivot around the trunnions 12 and 13. This will permit an easy withdrawal of the bolt from the hole in case the same should be necessary.

In order to hold the wings 14 and 19 in the position shown in Fig. 4, an ear 31 is thrown up from the edge of the wing 14 and this ear contacts with the portion of the wing 19 as shown in Fig. 4.

Many advantages result from the improved structure herein shown, especially from the fact that the two wings 19 and 14 are pivoted on opposite sides of the bolt and are also pivoted on a side of the bolt opposite to the side on which the stress taken by either of said wings occurs. This permits the wings being folded down into the contact shown in Fig. 3.

I do not wish to limit myself to the precise structure herein shown, since many changes may be made in the same by those skilled in the art without departing from the spirit of my invention as defined by the scope of the appended claims.

I claim:

1. In a toggle bolt, the combination of a bolt, a nut, trunnions on said nut, a wing pivoted on said trunnions, a portion of said wing being adapted to engage the wall, the arrangement being such that said trunnions are on the opposite side of said bolt from the portion of said wing which is adapted to engage the wall.

2. In a toggle bolt, the combination of a bolt, a nut, a wing pivoted on said nut, and a second wing pivoted to said first wing.

3. In a toggle bolt, the combination of a bolt, a nut, a wing pivoted on said nut at a point offset from the central line of said bolt and extending to the opposite side of said bolt, and a second wing pivoted on said first wing.

4. In a toggle bolt, the combination of a bolt, a nut, a wing pivoted on said nut, a second wing pivoted on said first wing, and a spring tending normally to hold the said wings at right angles to said bolt.

5. In a toggle bolt, the combination of a bolt, a nut, a wing pivoted on said nut, a second wing pivoted on said first wing, and a spring connected between one of said wings and said nut to hold said wings at right angles to said bolt.

ARTHUR F. POOLE.